United States Patent [19]

Paton

[11] Patent Number: 5,512,922
[45] Date of Patent: Apr. 30, 1996

[54] METHOD OF MULTI-TONE PRINTING

[75] Inventor: Anthony D. Paton, Cambridge, England

[73] Assignee: XAAR Limited, Cambridge, England

[21] Appl. No.: 316,256

[22] Filed: Sep. 30, 1994

Related U.S. Application Data

[63] Continuation-in-part of Ser. No. 594,772, Oct. 9, 1990, Pat. No. 5,361,084.

[30] Foreign Application Priority Data

Oct. 10, 1989 [GB] United Kingdom .................. 8922821
Jan. 23, 1990 [GB] United Kingdom .................. 9001493

[51] Int. Cl.$^6$ .................................................. B41J 2/205
[52] U.S. Cl. ................................................ 347/12; 347/15
[58] Field of Search ................................ 347/11, 12, 13, 347/15, 40, 41, 43, 69, 94

[56] References Cited

U.S. PATENT DOCUMENTS

| | | | |
|---|---|---|---|
| 4,251,823 | 2/1981 | Sagae | 347/12 |
| 4,503,444 | 3/1985 | Tacklind | 347/11 |
| 4,513,299 | 4/1985 | Lee et al. | 347/11 |
| 4,521,788 | 6/1985 | Kimura et al. | 347/40 X |
| 4,536,097 | 8/1985 | Nilsson | 347/68 |
| 4,746,935 | 5/1988 | Allen | 347/56 |
| 4,873,535 | 10/1989 | Sasaki | 347/182 |
| 4,887,100 | 12/1989 | Michaelis et al. | 347/69 |
| 4,908,635 | 3/1990 | Iwasawa et al. | 347/14 |
| 5,016,028 | 5/1991 | Temple | 347/69 |
| 5,028,936 | 7/1991 | Bartky et al. | 347/69 |
| 5,266,965 | 11/1993 | Komai et al. | 347/12 |
| 5,361,084 | 11/1994 | Paton et al. | 347/15 |

FOREIGN PATENT DOCUMENTS

| | | | |
|---|---|---|---|
| 0124190 | 7/1984 | Germany | B41J 3/04 |
| 61-293863 | 12/1986 | Japan | B41J 3/04 |
| 2157623 | 4/1984 | United Kingdom | B41J 3/04 |

*Primary Examiner*—Benjamin R. Fuller
*Assistant Examiner*—Alrick Bobb
*Attorney, Agent, or Firm*—Marshall, O'Toole, Gerstein, Murray & Borun

[57] ABSTRACT

A method of multi-tone printing employs a drop-on-demand printing apparatus 100 for depositing ink droplets from an array of channels 104 on printing element areas of a substrate 111 which is movable relatively to said apparatus. The channels length and nozzle location and dimensions afford each channel with a high longitudinal resonant frequency and electrically actuable means 110,112,114,116,118 supply energy pulses to a selected band of channels at or near the resonant frequency of the channels to deposit from each selected channel in the corresponding printing element area of the substrate a number of drops equal to the number of pulses applied thereto, the number of pulses applied being dependent on the tone of printing required. Droplet ejection from even numbered channels is in anti-phase at the resonant frequency with droplet ejection from odd numbered channels.

27 Claims, 5 Drawing Sheets

METHOD OF MULTI-TONE PRINTING

CROSS REFERENCE TO RELATED APPLICATIONS

This application is a continuation-in-part of Ser. No. 07/594,772 of Oct. 9th, 1990 U.S. Pat. No. 5,361,084.

BACKGROUND OF THE INVENTION

This invention relates to multi-tone printing employing drop-on-demand printing apparatus. More particularly the invention relates to such apparatus for printing on printing element areas on a substrate which is movable relatively to said apparatus and comprises an array of parallel, uniformly spaced channels provided with respective ink ejection nozzles, a liquid supply means common to said channels and electrically operated means for applying pulses of energy to liquid in said channels to effect ink ejection therefrom.

Aspects of such printing apparatus are described for example in U.S. Pat. No. 4,584,590 and commonly assigned U.S. Pat. Nos. 4,887,100; 4,992,808, 5,003,679 and 5,028,936 of which the contents of the latter are herein incorporated by reference.

The types of printing apparatus disclosed in the references quoted are of the kind in which energy pulses are imparted to ink by displacement of wall portions of the respective ink channels. It is known that the human eye can sense sixty-four gradations of greyscale in multi-tone printing. It is even suggested that twice as many gradations can be discriminated. Accordingly, it is one aim of high quality tone printing, including colour printing, to produce a printer capable of printing a number of greyscale tones as near as possible to the discriminating capability of the eye of the viewer.

In U.S. Pat. No. 4,513,299 there is disclosed a single channel, drop-on-demand ink jet printing device in which droplets of ink having different droplet volumes can be deposited on a print medium at a droplet repetition rate just below the resonant frequency of the ink channel. The different droplet volumes are achieved by following a droplet ejection pulse with additional droplet ejection pulses of like magnitude to the initial droplet ejection pulse at a frequency at or near the channel resonant frequency. The additional droplet ejection pulses cause ejection from the ink channel of further drop volumes of substantially the same size as the drop volume emitted from the channel by the initial droplet ejection pulse. In the series of drop volumes thus emitted, the second and subsequent drop volumes are each connected to the preceding drop volume emitted and the drop volumes join together to form an enlarged droplet which is deposited on the print medium. However, in high density array drop-on-demand printers, i.e. arrays of at least two parallel channels per mm, the known method of droplet ejection severely limits, to only a few, the number of droplet volumes which can be added to the droplet volume initially ejected from any particular channel. This number diminishes rapidly with increase of channel density. It follows that the number of greyscale gradations which can be achieved by this known method is limited in the achievable number of different drop volumes which can be deposited at a pixel of the printed image.

U.S. Pat. No. 4,536,097 discloses a piezoelectric printhead having channels defined by a row of parallel piezoelectric strips which can be deformed in direct mode. Each working channel, with its two piezoelectric strips, is separated from the next by a dummy channel filled with elastomer or air and the arrangement is therefore limited as to the channel resolution that can be achieved. The printhead is not capable of producing drops of varying sizes.

GB-A-2 157 623 discloses a method of operating an ink jet apparatus to control dot size. Relatively small ink chambers have separate large piezoelectric transducers communicating with the respective chambers through a mechanical coupling including a foot and a diaphragm. It is proposed that by synchronously exciting either one or a combination of the fluid and mechanical resonant frequencies of the ink jet apparatus and by repeating this operation in an iterative or successive manner in synchronism with the dominant resonant frequency, a plurality of ink droplets can be ejected within a time period permitting the droplets to merge while airborne or upon the recording medium.

It is an object of the present invention, to provide an improved method of greyscale printing which employs a compact drop-on-demand printer having an array of parallel channels which enables printing at high density and with a substantially greater number of greyscale gradations than has been achievable hitherto.

SUMMARY OF THE INVENTION

Accordingly, the present invention consists, in one aspect, in a method of printing employing drop-on-demand ink jet apparatus comprising an array of parallel channels, disposed side by side and having side walls which extend in the lengthwise direction of the channels and separate one from the next of the channels, the channels having the same longitudinal acoustic resonant frequency, a series of nozzles which communicate respectively with said channels for ejection of ink therefrom; connection means for connecting the channels with a source of ink and electrically actuable means for effecting transverse displacement in opposite senses of a portion at least of a channel separating side wall of a selected channel to effect ink ejection therefrom; comprising the steps of receiving print data; selecting in accordance with said print data a band of channels for ink ejection and actuating the electrically actuable means to apply sequences of pulses of energy at or near the longitudinal acoustic resonant frequency within the selected band to first and second interleaved groups of channels in anti-phase and varying the width of the band in successive cycles of the resonant frequency to control print density in accordance with said print data.

Where colour printing is required, the method of the invention consists in arranging the array of channels in a set or sets of four rows of channels, the rows of each set being respectively supplied with black ink and ink of the three primary colours and disposing the rows of each set for printing a row of printing element areas extending transversely to the direction of relative motion of the array and the substrate so that each area printed can be printed in black ink or ink of one of the three primary colours.

Advantageously, the channel length, channel nozzle diameter and channel density of the apparatus lie respectively in the range 10 to 1 mm, 20 to 10 μm and 2 to 16 per mm. For any particular printhead apparatus, the said dimensions are chosen to provide channel resonant frequencies of above 25 KHz. Preferably, the chosen resonant frequency is in the range 50 KHz to 250 KHz.

Suitably, said electrically actuable means effect ink ejection from said channels by displacement of respective, piezo-electric side wall portions of said channels.

In a preferred embodiment, the first and second interleaved groups of channels within a selected band of channels comprise respectively odd numbered and even numbered channels of that selected band.

In another aspect, the present invention consists in ink jet printing apparatus comprising an array of parallel channels, disposed side by side and having side walls which extend in the lengthwise direction of the channels and separate one from the next of the channels, the channels having the same longitudinal acoustic resonant frequency, a series of nozzles which communicate respectively with said channels for ejection of ink therefrom; connection means for connecting the channels with a source of ink; electrically actuable means for effecting transverse displacement in opposite senses of a portion at least of a channel separating side wall of a selected channel to effect ink ejection therefrom; and control means for receiving print information and, responsive thereto, selecting a band of adjacent channels for ink ejection and actuating the electrically actuable means to apply sequences of pulses of energy at or near the longitudinal acoustic resonant frequency in anti-phase to first and second interleaved groups of channels within said selected band and varying the width of the band in successive cycles of the resonant frequency to control print density.

DESCRIPTION OF PREFERRED EMBODIMENTS

The method of the invention can be performed by a drop-on-demand ink jet printing apparatus comprising an array, preferably a high density array, of parallel uniformly spaced channels provided with respective droplet ejection nozzles, an ink supply common to said channels and electrically actuable means for applying pressure pulses to effect droplet ejection from the channels. Preferably, pressure pulses are applied by displacing piezo-electric wall portions of the channels.

In commonly assigned U.S. Pat. No. 4,887,100 there is described e.g. with reference to FIGS. 2(a)–(d), a form of printhead in which said displaceable piezo-electric wall portions comprise the channel dividing side walls. In this case, each of the channel dividing side walls is shared between the channels which it separates so that in a first of successive phases of operation it can be deflected together with the facing wall of one of the channels which it separates to eject a droplet from said one of the channels whilst in a succeeding phase of the operation the said channel dividing wall together with the facing side wall of the other of the channels which it separates can be deflected to eject a droplet from said other of the channels. The channel densities of such printheads can be from 2 to 16 per mm. Hitherto, the operation of this form of printhead has been limited to the application of a voltage waveform pulse which acts to eject a single drop of ink from the channel to which the pulse is applied. The present invention calls for droplet ejection from the channels at high frequency at or near the longitudinal acoustic resonant frequency of the channels. Accordingly the channel length and nozzle dimensions have to be chosen to that end preferably lying within the ranges 1–10 mm and 10–20 µm respectively.

Printheads of the kind described can also be employed according to this invention as greyscale and, therefore, colour printers. A typical value for the resolution of printing element areas or pixels on a paper substrate for a printhead as described in U.S. Pat. No. 4,887,100 would be 6 or 12 per mm. In the area corresponding to each pixel, a variable number of droplets in the range 1 to 64 is made available as hereinafter described. Typical values of ink drop parameters at each channel nozzle and on the paper substrate area are then as follows:

| Resolution of Printhead —/mm | Pitch of Nozzles µm | Full 64 Droplet Volume pl | Single Drop Volume pl | Single Droplet Diameter µm | Droplet Frequency KHz |
| --- | --- | --- | --- | --- | --- |
| 12 | 83 | 33 | 0.51 | 10 | 180 |
| 6 | 167 | 130 | 2.04 | 15.7 | 90 |

The full size drop volume, which forms a pool of 64 single ejected small droplets on the paper substrate is chosen to form contiguous dots at full tone. The substrate velocity under the conditions of the above table in each case was chosen to be 0.15 m sec$^{-1}$.

Figure 1:
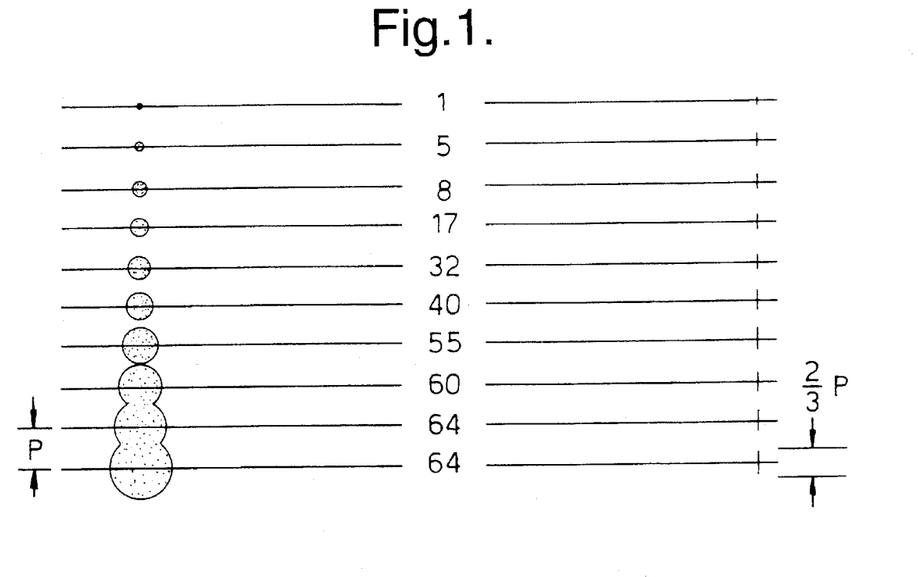
FIG. 1 illustrates the effect of depositing in successive printing element areas, that is to say, pixels, as the print medium moves past a nozzle of a channel of a drop-on-demand ink jet printer, a variable number of ink drops between 1 and 64.

FIG. 1 shows the effect of depositing a variable number of ink droplets between 1 and 64 in successive pixels as the paper moves past the nozzle. Typically, the maximum droplet production frequency is sufficient to generate 100 droplets per pixel, so that if 640 droplets are generated, these are deposited in a line occupying approximately ⅔ of the pixel pitch "p". When smaller numbers of droplets are generated as a sequence these are deposited along correspondingly shorter lines.

From the above table of typical values and assuming there are 100 droplets able to be generated per pixel, the spacing between droplets deposited longitudinally in each pixel, for twelve pixels per mm, is 0.83 µm and for six pixels per mm is 1.67 µm. Laterally the nozzle pitch is equal to the pixel pitch. The spacing in the lines in which they are deposited of the small droplets is small compared with the diameter of the small droplets, 0.83 µm compared with 10 µm for twelve pixels per mm and 1.67 µm compared with 15.7 µm for six pixels per mm. Also, the period during which a droplet sequence is ejected, i.e $$\frac{64 \times 10^3}{180000} = 0.35 \text{ msec. for 12 pixels per mm, and}$$

$$\frac{64 \times 10^3}{90000} = 0.7 \text{ msec}$$

for six pixels per mm is short compared with the time, of a few milliseconds, that ink takes to be absorbed into the paper substrate.

Thus the deposited lines of ink droplets in each pixel have time to collect and spread as dots of liquid ink on the paper surface. The line in which the droplets from any particular nozzle are deposited has little effect on the shape but only on the diameter of the dot formed at the pixel. FIG. 1 shows that the relative timing of the deposition of the lines of droplets at the pixels is chosen so that each drop sequence is deposited symmetrically with respect to the corresponding pixel. This reduces any distortion in the image which could result in contouring and inhibits any tendency to merging of the droplets deposited at adjacent pixels.

Figure 2:
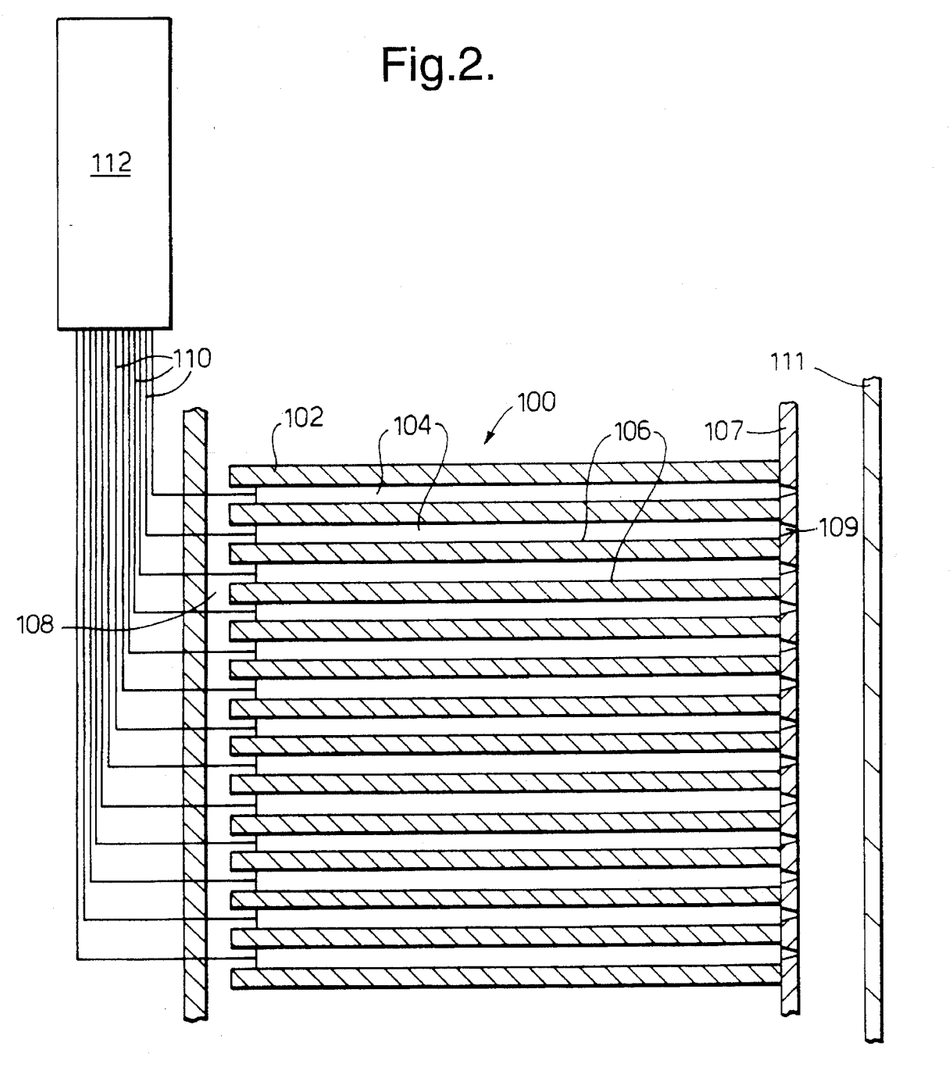
FIG. 2 illustrates drop-on-demand ink jet printing apparatus for use in accordance with the present invention.

Referring now to FIG. 2, there is illustrated therein a printhead 100, which is generally similar to that described in relation to FIGS. 2(a) to (d) of U.S. Pat. No. 4,887,100 the contents of which are herein incorporated by reference. The printhead 100 comprises a sheet of piezo-electric material 102 poled in a direction normal thereto and formed with parallel channels 104 at a density of two or more per millimetre having channel dividing side walls 106. The channels 104 are each lined with a metal electrode layer (not shown) Each channel electrode layer is connected through a respective lead 110 with control means 112 which receives print data. The channels are actuated in shear mode by applying an electric potential difference between the electrode layer of an actuated channel and the electrode layers of the channels on either side of the actuated channel. The potential difference if applied is a signal of frequency at or near the longitudinal acoustic resonant frequency of the channels and is applied for the duration of a number of pulses of the signal corresponding to the number of droplets which it is desired to eject from the actuated channel. The channels are supplied with printing liquid from a common supply duct 108 connected with each channel at the end thereof opposite that at which is located a nozzle plate 107 formed with respective nozzles 109 which terminate the channels. The nozzles are co-linearly disposed transversely to the direction of movement of a substrate 111, e.g. paper.

Figure 3:
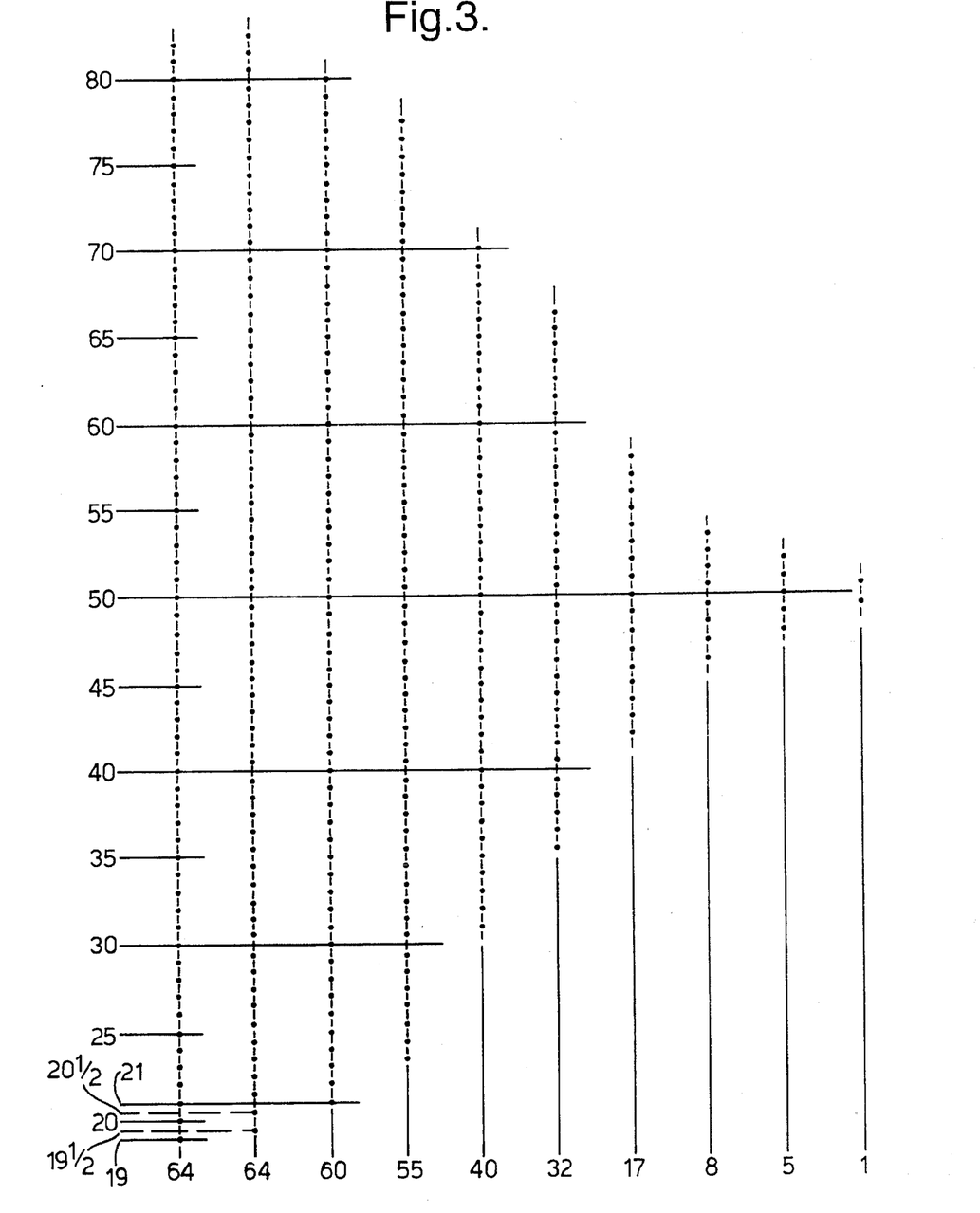
FIG. 3 illustrates diagrammatically, in an embodiment of the invention, the printing of a line of printing element areas or pixels from a group of ten channels, the respective nozzles of which eject bursts of varying numbers of droplets between 1 and 64.

FIG. 3 illustrates diagrammatically one manner in which the droplets are ejected from the nozzles of ten channels of a segment of a high density array printhead of the type described in U.S. Pat. No. 4,887,100, for example, with respect to FIG. 2(a) to (d) thereof. The channels here are arranged in two groups of interleaved odd and even numbered channels. To activate a set of adjacent channels, the selected channels of one group are activated by applying a resonant waveform in alternating phase with the channels of the other group. Thus drops are ejected from channels of the two groups in numbers depending on the number of waveforms applied in alternating phases of the resonant waveform as the dividing walls pressurise channels of the interleaved groups alternately.

In FIG. 3 the densities at pixels opposite the ten channel nozzles are for channels 1 to 10 (numbering from left to right in the figure) respectively 64, 64, 60, 55, 40, 32, 17, 8, 5 and 1 droplets. A single pixel in the direction of relative motion between the printhead and paper substrate is traversed in a period which is equal to the period of 100 cycles of the resonant frequency of the channels, i.e. for the frequencies 180 KHz and 90 KHz of the table set out above of typical values, respectively, 0.55 and 1.11 msecs. These times are those which it would take to emit 100 droplets from each channel. The dots in the drawing represent droplets, a maximum of 64 of which are deposited from any particular channel per pixel and the actuation of the channels is preferably arranged so that the droplets deposited from any particular channel are symmetrically deposited with respect to the pixel being printed. That is to say the centre of the pixel is traversed after the elapse of fifty of the hundred cycles allocated to that pixel. The lateral pitch of the channel nozzles is made equal to the longitudinal pitch of the pixels traversed by each nozzle.

Thus in each pixel period, i.e. the period in which, if supplied to the electrodes of any particular channel, the applied voltage pulses would generate 100 droplets, the number of droplets from each channel would be between one and sixty-four in the numbers stated earlier.

The droplets are ejected from the selected odd numbered channels as a result of actuation of the channels during the positive parts of the cycles and the selected even numbered channels are actuated one half cycle following, that is to say, out of phase with, activation of the selected odd numbered channels.

Printing starts with the pixels having the maximum number, i.e. 64, of droplets which are the pixels traversed by the nozzles of channels 1 and 2 and the timing of droplet deposition proceeds as follows:

| Cycles | Channels Depositing Drops |
|---|---|
| 0 to 18 | NIL |
| 19 | 1 |
| 19½ | 2 |
| 20 | 1 |
| 20½ | 2 |
| 21 | 1, 3 |
| 21½ | 2 |
| 22 | 1, 3 |
| 22½ | 2 |
| 23 | 1, 3 |
| 23½ | 2, 4 |
| 24 | 1, 3 |
| 24½ | 2, 4 |
| 25 | 1, 3 |
| 25½ | 2, 4 |
| 26 | 1, 3 |
| 26½ | 2, 4 |
| 27 | 1, 3 |
| 27½ | 2, 4 |
| 28 | 1, 3 |
| 28½ | 2, 4 |
| 29 | 1, 3 |
| 29½ | 2, 4 |
| 30 | 1, 3 |
| 30½ | 2, 4 |
| 31 | 1, 3, 5 |
| 31½ | 2, 4 |
| 32 | 1, 3, 5 |
| 32½ | 2, 4 |
| 33 | 1, 3, 5 |
| 33½ | 2, 4 |
| 34 | 1, 3, 5 |
| 34½ | 2, 4 |
| 35 | 1, 3, 5 |
| 35½ | 2, 4, 6 |
| 36 | 1, 3, 5 |
| 36½ | 2, 4, 6 |
| 37 | 1, 3, 5 |
| 37½ | 2, 4, 6 |
| 38 | 1, 3, 5 |
| 38½ | 2, 4, 6 |
| 39 | 1, 3, 5 |
| 39½ | 2, 4, 6 |
| 40 | 1, 3, 5 |
| 40½ | 2, 4, 6 |
| 41 | 1, 3, 5 |
| 41½ | 2, 4, 6 |
| 42 | 1, 3, 5, 7 |
| 42½ | 2, 4, 6 |
| 43 | 1, 3, 5, 7 |
| 43½ | 2, 4, 6 |
| 44 | 1, 3, 5, 7 |
| 44½ | 2, 4, 6 |
| 45 | 1, 3, 5, 7 |
| 45½ | 2, 4, 6 |

-continued

| Cycles | Channels Depositing Drops |
|---|---|
| 46 | 1, 3, 5, 7 |
| 46½ | 2, 4, 6, 8 |
| 47 | 1, 3, 5, 7 |
| 47½ | 2, 4, 6, 8 |
| 48 | 1, 3, 5, 7, 9 |
| 48½ | 2, 4, 6, 8 |
| 49 | 1, 3, 5, 7, 9 |
| 49½ | 2, 4, 6, 8 |
| 50 | 1, 3, 5, 7, 9 |
| 50½ | 2, 4, 6, 8, 10 |
| 51 | 1, 3, 5, 7, 9 |
| 51½ | 2, 4, 6, 8 |
| 52 | 1, 3, 5, 7, 9 |
| etc etc | etc etc |
| " | " |
| " | " |
| 83 to 100 | NIL |

It will be apparent from inspection of the above table that the band of actuated channels gradually widens and then narrows since the print density is less at the end of the line in the region of channels 9 and 10, than in the region of channels 1 and 2. Channel No. 1 thus ejects every cycle from cycle 19 to cycle 82, channel No. 2 every half cycle from cycle 19½ to 82½, channel No. 3 every cycle from cycle 21 to cycle 80, channel No. 4 every half cycle from cycle 23½ to cycle 77½, channel 5 every cycle from cycle 31 to cycle 70, channel 6 every half cycle from cycle 35½ to cycle 66½, channel 7 every cycle from cycle 42 to cycle 58, channel 8 every half cycle from cycle 46½ to 53½, channel 9 every cycle from cycle 48 to cycle 52, and channel 10 at half cycle 50½.

If necessary, the first few drops of a sequence can be prevented from merging by applying initial sub-threshold resonant waveforms or by increasing the energy content of the first few pulses applied by the electrically operated means of the printhead to the channel selected for droplet ejection.

it is to be noted that the arrangement is efficient and high speed in that there is no requirement to wait for the correct mode or phase before firing a selected channel. Any channel can, generally speaking, be fired at any time.

The above described method of operation of a printhead represents a significant departure from previous approaches. To understand this in more detail, consider a printhead comprising an array of closely spaced ink channels having its electric wall actuators between adjacent channels. With this construction, neighbouring channels cannot be actuated independently. When selected channels in the array are actuated through transverse displacement of the corresponding side walls, there will generally be the same total amount of negative pressure generated in "non-selected" channels, as the amount of positive pressure which serves to effect drop ejection in selected channels. In binary printing it is therefore appropriate—and this is well known—to divide the printhead into groups of two or more channels. One group of channels is enabled at any one time and positive pressure pulses are generated in the selected channels of that group so as to eject drops. Then, drops are ejected from selected channels in the other groups as these are successively enabled. Steps are taken, for example through offsetting of the nozzles, to ensure that the time difference between enablement of successive groups of channels does not result in displacement errors in the printer droplet.

The possibility exists, as identified by the present inventors, of operating multi-tone or greyscale printing apparatus in a broadly similar manner. By arranging for each channel to have a high longitudinal acoustic resonant frequency and then applying energy pulses to the channel at or near that frequency, it is possible during the enablement of one group of channels to eject not one drop from each selected channel in the group but a number of perhaps from one to sixty-four drops from each selected channel. Steps, for example by offsetting nozzles, are taken to ensure that drops—of whatever size—printed by channels in one group are not displaced spuriously on the print surface from drops associated with another group of channels.

According to the present invention, however, multi-tone or greyscale printing is achieved in a radically different manner. Instead of ensuring that for around one hundred cycles of the actuating frequency, there is at least one disabled channel on either side of a selected channel, so as to avoid problems with "unwanted" pressure changes in the channels neighbouring a selected channel, a band of channels is selected and the wall separating any two channels in the selected band is actuated at the resonant frequency to cause droplets to be ejected in anti-phase from both channels. In the selected band, all channels eject droplets and there is no fundamental requirement for any particular group of channels to be disabled. Whilst there may be a difference in the timing of droplet ejection from one channel and its neighbour, this is not significant. It will be understood that if the walls are being actuated at the resonant frequency to eject up to sixty-four drops, the error arising from droplet ejection being in anti-phase between neighbouring channels is one-half in sixty-four or less than one percent. This is negligible in terms of the error in the print after drop spreading.

As will be apparent to the skilled reader, the control means 112 is effective to receive print information and, responsive thereto, select a band of adjacent channels for ink ejection and actuate the electrically actuable means in the form of the piezoelectric side walls to apply sequences of pulses of energy at an operating frequency in antiphase to first and second interleaved groups of channels within the selected band and vary number of adjacent channels in the band in successive cycles of the operating frequency to control print density.

Figure 4A:
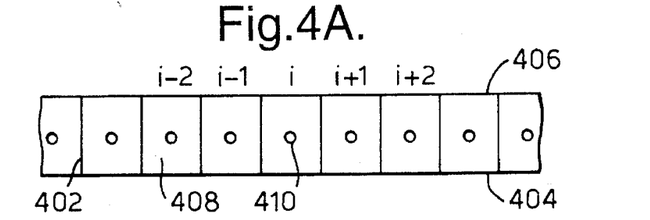
FIGS. 4(a) to 4(c) illustrates in stylised form the manner of operation of the printhead shown in FIG. 2.
Figure 4B:
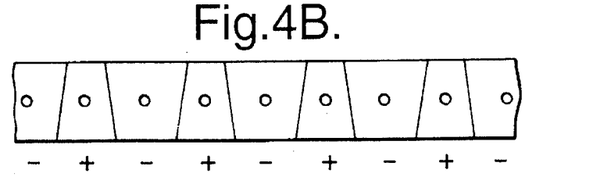
Figure 4C:
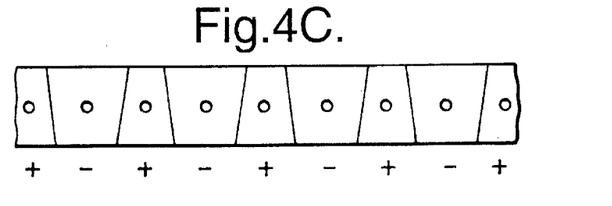

It may be helpful in understanding this invention further, to refer to FIGS. 4(a) to 4(c) which illustrates in diagrammatic form the manner in which channel side walls are actuated to eject multi-tone droplets.

FIG. 4(a) simply shows a printhead construction, such as that of FIG. 2, in a stylised form. Piezo-electric side walls 402, transversely displaceable in shear mode, extend between a substrate 404 and a cover 406. Elongated ink channels 408 are thus defined, each terminating in a nozzle 410. The channels can conveniently be numbered with FIG. 4(a) showing a series of consecutive channels centred on the i'th channel.

Assuming that the print pattern dictates the ejection of drops from channel i–4 to i+4, FIG. 4(b) shows the position of the actuated side walls in the first half cycle of the longitudinal acoustic resonant frequency. It will be seen that the side walls within the selected band of channels move so as to create positive and negative pressure states, alternately, in the channels. Drops are ejected from those alternate channels in the band to which a positive pressure state is applied. In the next half cycle of the resonant frequency, depicted in FIG. 4(c), the position of the displaced side walls is reversed and droplets are ejected from the remaining channels in the selected band. In succeeding cycles of the resonant frequency, the width of the selected band (that is to say the number of channels in the selected band) may increase or decrease in dependence upon the print requirement, in the manner as described before in relation to FIG. 3.

Experiment has shown, perhaps surprisingly, that with ink channels communicating at one end with the common ink manifold, actuation as described of the channel separating side walls at the longitudinal acoustic resonant frequency will cause drops to be ejected continuously—within the selected band—with droplet ejection being in anti-phase between adjacent nozzles. Replenishment of the channels from the manifold occurs as a synchronous process. It will be recognised that the effect of displacing the two side walls of a particular channel is to cause pressure waves to travel along the channel in opposite senses. The above references to positive and negative pressure pulses in the selected channels should be understood accordingly.

A further effect that has been noted concerns the interplay between each channel and the common ink manifold and—particularly—the crosstalk between channels that is expected to occur via the manifold. It has surprisingly been found that with neighbouring channels actuated in anti-phase at the longitudinal acoustic resonant frequency and with synchronous replenishment of the channels, there is a marked reduction in crosstalk as compared with the case where, say, sixty-four droplets are ejected from one channel, followed by up to sixty-four droplets from the two adjoining channels.

The above description has been given in terms of pressure magnitude and phases because it is the pressure wave magnitude that primarily controls the drop ejection process, it will be in the normal capability of the skilled man to then choose voltages to be applied to the printhead, whose magnitudes generate required pressures. In the arrangement described in the patents incorporated herein by reference, a single electrode is provided in each channel and it is accordingly the difference in voltages applied to successive channels that controls the potential difference applied to the piezoelectric side wall which separates them. As set forth in the commonly assigned U.S. Pat. application Ser. No. 08/039,365, U.S. Pat. No. 5,438,350 the calculation of voltages required to produce specified pressure changes will take into account the compliance of the wall actuators.

it will be recognised that at the extreme ends of a selected band of channels, the applied voltages will be required to be modified to compensate for edge effects.

Figure 5A:
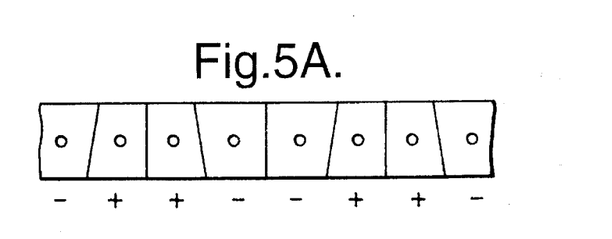
FIGS. 5(a), 5(b), 6(a), 6(b), 7(a) and 7(b) illustrate in a similar way the method of operation of alternative embodiments of this invention.
Figure 5B:
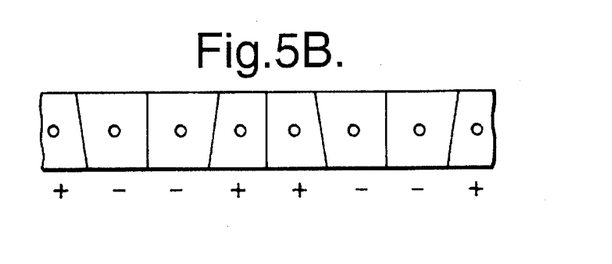

Referring now to FIGS. 5(a) and 5(b), there is depicted in similar manner an alternative strategy for actuating channels. FIGS. 5(a) and 5(b) show respectively the position of the actuable side walls in different half cycles of the longitudinal acoustic resonant frequency. It will be seen that alternate walls reverse in position from half cycle to half cycle, with droplets being ejected from adjacent pairs of channels in anti-phase with intervening pairs of channels.

The arrangements of FIGS. 4 (a) to 4(c), 5(a) and 5(b) have in common the feature that all channels are potentially active. There will now be described arrangements in which groups of channels are successively enabled for activation.

Figure 6A:
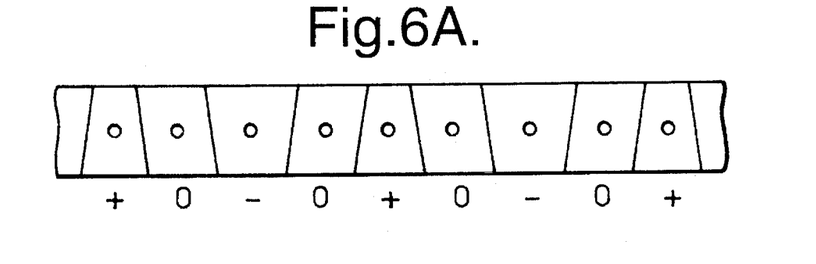
Figure 6B:
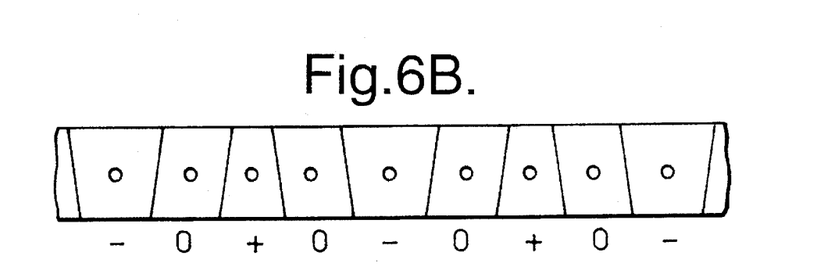
Figure 7A:
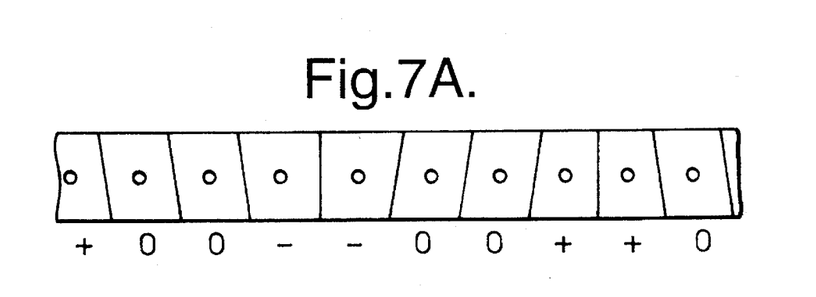
Figure 7B:
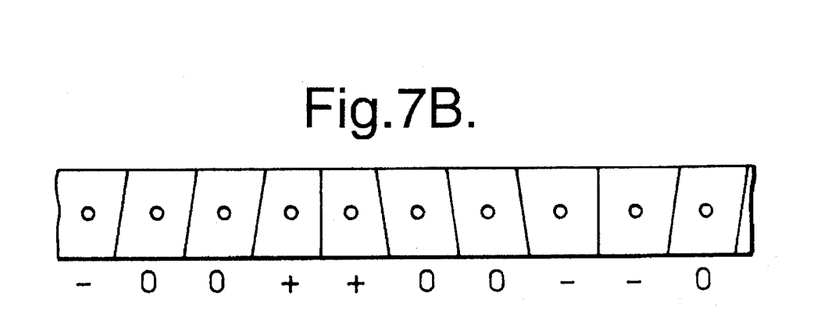

Turning to FIGS. 6(a) and 6(b), there is shown, similarly in FIGS. 6(a) and 6(b), the position of the actuable side walls in the selected band, at different half cycles of the resonant frequency. It will be observed that all channel walls within the selected band reverse in position from one half cycle to the next. However, alternate channels see no pressure change since both side walls of the channel move always in tandem. After completion of an appropriate number of cycles of the resonant frequency, perhaps one hundred, the mode of operation is changed, with drops being ejected (still in anti-phase from one channel to the next channel in the group) from the other phase of channels. Yet a further strategy for operation is depicted in FIGS. 7(a) and 7(b). Under this strategy, one half of the channels are available for actuation in each phase.

It will be understood that a considerable number of strategies can be identified in which drops are ejected in anti-phase at the resonant frequency between channels in a selected band or between a subset of one half or one third (or one n'th) of the channels in the selected band. It is not essential that the side walls of a disabled channel move in tandem to apply "zero" pressure. Thus, in one example, enabled channels in the selected band will have both side walls moving inwardly in one half cycle and outwardly in the next half cycle to create positive and negative pressures. An adjacent, disabled channel would "see" only one side wall moving to create pressure changes which are non-zero but below the threshold required for droplet ejection.

Whilst specific reference has been made to apparatus as described in commonly assigned U.S. Pat. No. 4,887,100, the present invention is applicable to a wide range of ink jet apparatus in which a channel dividing side wall is displaceable in either of two opposing directions. Moreover, some of (but not all) the advantages set forth above can be enjoyed by applying the present invention to drop-on-demand ink jet apparatus employing other electrically actuable means to eject droplets. Specifically, the above described reduction in crosstalk through a common ink manifold, can be achieved without a transversely displaceable side wall.

I claim:

1. A method of printing employing a drop-on-demand ink jet apparatus comprising an array of parallel channels, disposed side by side and having side walls which extend in a lengthwise direction of the channels and separating one channel from another, the channels having an identical longitudinal acoustic resonant frequency, at least some of the channels being arranged into first and second interleaved groups of channels, a series of nozzles which communicate respectively with said channels for ejection of ink therefrom; connection means for connecting the channels with a source of ink and electrically actuable means for effecting transverse displacement in opposite senses of a portion at least of a channel separating side wall of a selected channel to effect ink ejection therefrom; the method comprising the steps of receiving print data; selecting in accordance with said print data a band of adjacent channels for ink ejection and actuating the electrically actuable means to apply sequences of pulses of energy at or near the longitudinal acoustic resonant frequency within the selected band to first and second interleaved groups of channels in anti-phase and varying a number of adjacent channels in the band in successive cycles of the resonant frequency to control print density in accordance with said print data.

2. The method as claimed in claim 1, wherein said electrically actuable means effects ink ejection from said channels by displacement of respective, piezo-electric side wall portions of said channels.

3. The method claimed in claim 1, wherein the said channels have a length, nozzle diameter and density respectively in the ranges of 10 to 1 mm, 20 to 10 µm and 2 to 16 per mm.

4. The method claimed in claim 1, wherein said frequency of pulses applied by the electrically actuated means is a the range of 50 KHz to 250 KHz.

5. The method claimed in claim 2, wherein the piezoelectric side wall portions of said channels within said band of channels are repetitively displaced at said longitudinal acoustic resonant frequency.

6. The method claimed in claim 1, comprising the step of arranging the arrays of channels in a set or sets of four rows of channels for movement relative to a substrate, the rows of each set being respectively supplied with black ink and ink of the three primary colours and disposing the rows of each set for printing a row of printing element areas extending transversely to a direction of relative motion of the array and the substrate so that each area printed can be printed in black ink or ink of any of the three primary colours.

7. The method claimed in claim 1, wherein the first and second interleaved groups of channels within a selected band of channels comprise respectively odd numbered and even numbered channels of the selected band.

8. A drop-on-demand ink jet printing apparatus comprising an array of parallel channels, disposed side by side and having side walls which extend in a lengthwise direction of the channels and separating one channel from another, the channels having an identical longitudinal acoustic resonant frequency at least some of the channels being arranged into first and second interleaved groups of channels, a series of nozzles which communicate respectively with said channels for ejection of ink therefrom; connection means for connecting the channels with a source of ink; electrically actuable means for effecting transverse displacement in opposite senses of a portion at least of a channel separating side wall of a selected channel to effect ink ejection therefrom; and control means for receiving print information and, responsive thereto, selecting a band of adjacent channels for ink ejection and actuating the electrically actuable means to apply sequences of pulses of energy at or near the longitudinal acoustic resonant frequency in anti-phase to first and second interleaved groups of channels within said selected band and varying a number of adjacent channels in the band in successive cycles of the resonant frequency to control print density.

9. Apparatus as claimed in claim 8, wherein said electrically actuable means effects ink ejection from said channels by displacement of respective, piezo-electric side wall portions of said channels.

10. Apparatus as claimed in claim 8, wherein the said channels have a length, nozzle diameter and density respectively in the ranges of 10 to 1 mm, 20 to 10 μm and 2 to 16 per mm.

11. Apparatus as claimed in claim 8, wherein said frequency of pulses applied by the electrically actuated means is in a range of 50 KHz to 250 KHz.

12. Apparatus as claimed in claim 8, comprising a plurality of arrays of channels in a set or sets of four rows of channels arranged for movement relative to a substrate, the rows of each set being adapted to be respectively supplied with black ink and ink of the three primary colours, the rows of each set being disposed for printing a row of printing element areas extending transversely to a direction of relative motion of the array and the substrate so that each area printed can be printed in black ink or ink of any of the three primary colours.

13. Apparatus as claimed in claim 8, wherein the first and second interleaved groups of channels within a selected band of channels comprise respectively odd numbered and even numbered channels of the selected band.

14. A method of printing employing a drop-on-demand ink jet apparatus comprising an array of parallel channels at least some of the channels being arranged into first and second interleaved groups of channels, a series of nozzles which communicate respectively with said channels for ejection of ink therefrom; a common ink manifold connecting the channels with a source of ink and electrically actuable means associated with the channels for effecting droplet ejection therefrom; the method comprising the steps of: receiving print data; selecting in accordance with said print data a band of adjacent channels for ink ejection and actuating the electrically actuable means to apply sequences of pulses of energy at an operating frequency in anti-phase to first and second interleaved groups of channels within the selected band and varying a number of adjacent channels in the band in successive cycles of the operating frequency to control print density in accordance with said print data.

15. The method claimed in claim 14, comprising the step of arranging the arrays of channels in a set or sets of four rows of channels for movement relative to a substrate, the rows of each set being respectively supplied with black ink and ink of the three primary colours and disposing the rows of each set for printing a row of printing element areas extending transversely to a direction of relative motion of the array and the substrate so that each area printed can be printed in black ink or ink of any of the three primary colours.

16. The method claimed in claim 14, wherein the first and second interleaved groups of channels within a selected band of channels comprise respectively odd numbered and even numbered channels of the selected band.

17. A drop-on-demand ink jet printing apparatus comprising an array of parallel channels at least some being arranged into first and second interleaved groups of channels, a series of nozzles which communicate respectively with said channels for ejection of ink therefrom; a common ink manifold for connecting the channels with a source of ink; electrically actuable means associated with the channels for effecting ink ejection therefrom; and control means for receiving print information and, responsive thereto, selecting a band of adjacent channels for ink ejection and actuating the electrically actuable means to apply sequences of pulses of energy at an operating frequency in anti-phase to first and second interleaved groups of channels within said selected band and varying a number of adjacent channels in the band in successive cycles of the operating frequency to control print density.

18. Apparatus as claimed in claim 17, comprising a plurality of arrays of channels in a set or sets of four rows of channels arranged for movement relative to a substrate, the rows of each set being adapted to be respectively supplied with black ink and ink of the three primary colours, the rows of each set being disposed for printing a row of printing element areas extending transversely to the direction of relative motion of the array and the substrate so that each area printed can be printed in black ink or ink of any of the three primary colours.

19. Apparatus as claimed in claim 18, wherein the first and second interleaved groups of channels within a selected band of channels comprise respectively odd numbered and even numbered channels of that selected band.

20. A method of printing employing a drop-on-demand ink jet apparatus comprising an array of parallel channels, a series of nozzles which communicate respectively with said channels for ejection of ink therefrom; a common ink manifold connecting the channels with a source of ink and electrically actuable means associated with the channels for effecting ink ejection therefrom; the method comprising the steps of receiving print data; selecting in accordance with said print data a band of adjacent channels for ink ejection; and actuating the electrically actuable means to apply to channels within the selected band pressures according to any one of the following repeating sequences of channel pressure states:

| 1 | −1 | 1 | −1 | 1 | −1 | 1 | −1 | 1 |
|---|----|---|----|---|----|---|----|---|
| 1 | 1 | −1 | −1 | 1 | 1 | −1 | −1 | 1 |
| 1 | 0 | −1 | 0 | 1 | 0 | −1 | 0 | 1 |
| 1 | 1 | 0 | 0 | −1 | −1 | 0 | 0 | 1 | reversing in sign each non-zero pressure at an operating frequency and varying a number of adjacent channels in the band in successive cycles of the operating frequency to control in accordance with said print data the print density of channels in the band.

21. A method of multi-tone printing employing a drop-on-demand ink jet apparatus comprising an array of parallel channels having an acoustic resonant frequency, at least some of the channels being arranged in first and second interleaved groups, a series of nozzles which communicate respectively with said channels for ejection of ink therefrom; a common ink manifold connecting the channels with a source of ink and electrically actuable means associated with the channels for effecting ink ejection therefrom; the method comprising the steps of receiving print data; selecting channels of first and second interleaved groups of channels for ink ejection in accordance with the print data and actuating the electrically actuable means to apply sequences of pulses at said acoustic resonant frequency to effect ink ejection from the nozzles of the first and second groups of channels at said acoustic resonant frequency, ink ejection from said first and second groups of channels being in antiphase.

22. A method according to claim 21, further comprising the step of varying in number the pulses applied, to control print density in accordance with the print data.

23. A method according to claim 21, wherein said electrically actuable means effects ink ejection from said channels by displacement of respective piezo-electric side wall portions of said channels.

24. A method according to claim 21, wherein the first and second groups of channels comprise respectively odd numbered and even numbered channels in a band of adjacent channels.

25. A method of multi-tone printing employing a drop-on-demand inkjet apparatus comprising an array of parallel channels, at least some of the channels being arranged in first and second interleaved groups, a series of nozzles which communicate respectively with said channels for ejection of ink therefrom; a common ink manifold connecting the channels with a source of ink and electrically actuable means associated with the channels for effecting ink ejection therefrom; the method comprising the steps of receiving print data; selecting channels of first and second interleaved groups of channels for ink ejection in accordance with the print data and actuating the electrically actuable means to apply sequences of pulses at an operating frequency to effect ink ejection from the nozzles of the first and second groups of channels, ink ejection from said first and second groups of channels being in anti-phase at said operating frequency, wherein the channels of the array are assigned in a regular manner one to each of a least two phases, the phases being successively enabled for ink ejection at a phase enabling frequency which is substantially lower than said operating frequency.

26. A method according to claim 25, wherein said first and second groups of channels form a contiguous band of channels in one phase of channels.

27. A method according to claim 21, wherein the ink jet apparatus comprises a plurality of arrays of channels, each of said arrays connected to a source of ink of a different colour.

\* \* \* \* \*